(12) United States Patent
Silva et al.

(10) Patent No.: US 6,223,306 B1
(45) Date of Patent: Apr. 24, 2001

(54) METHOD AND APPARATUS FOR TESTING X SERVERS

(75) Inventors: Stephen Silva; Michael S. Allison, both of Fort Collins, CO (US); Fred Sprague, Aloha, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/032,619

(22) Filed: Feb. 27, 1998

(51) Int. Cl.[7] .............................. H02H 3/05; G06F 11/30; G06F 15/173; G06F 17/00
(52) U.S. Cl. .............................. 714/37; 714/38; 713/201; 709/224; 707/104
(58) Field of Search ........................ 714/38, 37; 709/224; 707/104; 713/200, 201

(56) References Cited

U.S. PATENT DOCUMENTS

| | | | |
|---|---|---|---|
| 5,343,409 | * | 8/1994 | Satterfield et al. .................. 364/514 |
| 5,408,600 | * | 4/1995 | Garfinkel et al. .................... 395/153 |
| 5,596,714 | * | 1/1997 | Connell ........................... 395/183.14 |
| 5,881,268 | * | 3/1999 | McDonald et al. .................. 395/500 |
| 5,909,544 | * | 6/1999 | Anderson, II et al. ......... 395/200.38 |
| 5,974,254 | * | 10/1998 | Hsu ...................................... 395/703 |

* cited by examiner

Primary Examiner—Norman M. Wright

(57) ABSTRACT

The present invention comprises a testing system for testing X Servers. The testing system comprises a test harness that communicates with an X Server being tested to obtain the test results therefrom, an archive database for storing test archives to be used by the test harness for testing the X Server, a test result storage database for storing results of an X Server test, and a viewing tool that presents the user with a result file which the user analyzes to determine the X Server defect. Preferably, the test harness is object-oriented code that has a polymorphic and hierarchical structure. The basic units of the test harness are objects, such as display connections, screens, graphics contexts, pixmaps, colormaps and windows. Within the test context, each object encodes a unique hierarchy that indicates its dependencies on other test harness objects. These objects encapsulate Xlib routines and hide much of the detail of Xlib programming from the test writer, thus facilitating the test writer in writing tests. Once a test has been written, the test is run and the results of the test, if they are correct, are stored as an archive file in the test archive storage database for later use. When a test is run on an X Server, the test harness captures the image rendered to the screen by the X Server. The test harness then searches the archive database in a predetermined manner to obtain the appropriate test archive. The test archive is then compared to the test results. If the test failed, then a defect exists in the X Server.

37 Claims, 12 Drawing Sheets

```
/***************************************************************
**                    X Objects                                **
**  The following section describes the X Objects for the GROND **
**  test harness.  These objects describe displays, screens,   **
**  windows, etc and their ancestors for clients wishing to    **
**  create and modify them.  An X object can have three states **
**  of existence: NOT CREATED, IMPLICITLY CREATED and          **
**  EXPLICITLY CREATED.  The first simply means that an object **
**  may be needed but has not been called for yet, therefore   **
**  there is no need to do any X protocol.  If an X object     **
**  is implicitly created, then another object was called for  **
**  that relies on this object as an ancestor, so this object  **
**  was created to accomodate it, any implicitly created objects**
**  will be defaults.  An implicitly created object can become **
**  an explicitly created object if the client asks for it.    **
**  An explicitly created object is an object that the client  **
**  asks for directly.  Such an object will always be an       **
**  explicitly created object.                                 **
***************************************************************/

/***************************************************************
** Convenience macros defining all X object types.             **
***************************************************************/ define GR_QUERY_TYPE(wd)   (wd & 0x7f)   /** allow only 7 bits
                                           *  valuse upto 127
                                           **/

/***************************************************************
** Macros defining the status of how an object was created.    **
***************************************************************/

/***************************************************************
 The bit positions of the type attr field in the GRObject    
 union define the attributes of that object.  The bit        
 positions and their meanings are as follows: (We will start 
 numbering the bit positions at "1")                         
                                                             
     bit 8:   0 = IMPLICITLY_CREATED                         
              1 = EXPLICITLY_CREATED                         
     bit 9:   0 = NOT_CREATED                                
              1 = CREATED                                    
     bit 10:  0 = Not Specified as Command Line Option       
              1 = Specified as Command Line Option           
***************************************************************/
```

*FIG. 4A*

```
#define GR_SET_EXPLICITLY_CREATED(wd)   (wd = (wd | (1UL << 7)))
#define GR_SET_IMPLICITLY_CREATED(wd)   (wd = (wd & ~(1UL << 7)))

#define GR_SET_CREATED(wd)       (wd = (wd | (1UL << 8)))
#define GR_SET_NOT_CREATED(wd)   (wd = (wd & ~(1UL << 8)))

#define GR_SET_CL_OPTION(wd)     (wd = (wd | (1UL << 9)))
#define GR_NO_CL_OPTION(wd)      (wd = (wd & ~(1UL << 9)))

#define GR_QUERY_EXPLICITLY_CREATED(wd)  (wd & (1UL << 7))
#define GR_QUERY_CREATED(wd)             (wd & (1UL << 8))
#define GR_QUERY_CL_OPTION(wd)           (wd & (1UL << 9))

/*************************************************************
** More memorable names instead of constants for function calls**
*************************************************************/ define GR_IMPLICITLY_CREATED   1
define GR_EXPLICITLY_CREATED   2
#define GR_NOT_CREATED          3
#define GR_CREATE_NOW           4

/*************************************************************
** Macros for the command line option flag: GR_CL_OPTION means**
** that this was creted as a command line option, and GR_NORMAL**
** means it was not specified on the command line.           **
*************************************************************/ define GR_CL_OPTION    4
define GR_NORMAL       5

/*************************************************************
** Macros that indicate the presence of GIE 2.0              **
*************************************************************/ define GR_GIE_UNKNOWN  0
define GR_GIE_PRESENT  1
define GR_GIE_ABSENT   2 define GR_GIE_EXTENSION_NAME "Get-RGB-Image"         39

/*************************************************************
** The display object. Describes a connection to an X server.**
*************************************************************/
                  25      40
typedef struct _GRDisplay {  42
    unsigned long type_attr;        /*For the union structure*/
    char       43  name[GR_MAX_STR_SIZE]; /*foo_machine:0*/
    short int      gie_here;        /*Is gie present?*/
    Display       *display;  } GRDisplay;
            44      40
```

*FIG. 4B*

```
/***********************************************************
** The screen object. Describes a screen driven by an X server**
** which is also present in this structure and specified by the**
** GRDisplay pointer.                                         **
***********************************************************/
typedef struct _GRScreen {
    unsigned long    type_attr;     /*For the union structure*/
    GRDisplay        *my_display;
    GRScreenMode     mode;
    int              width;
    int              height;
    char             deviceID[GR_MAX_STR_SIZE];
    union _GRObject  *up;   /*For multi screen*/
    union _GRObject  *down;
    union _GRObject  *left;
    union _GRObject  *right;
    int              slsRows;       /*Number of displays in an SLS row*/
    int              slsColumns;    /*Number of displays in an SLS column*/
    int              slsAltScreenWidth;   /*Width of each display in SLS*/
    int              slsAltScreenHeight;  /*Height of each display in SLS*/
    int              number;  } GRScreen;

/***********************************************************
** The visual object. Describes a visual present on a screen **
** which is also present in this structure and specified by the**
** GRScreen pointer.                                          **
***********************************************************/
typedef struct _GRVisual {
    unsigned long    type_attr;     /*For the union structure*/
    GRScreen         *my_screen;
    int              vis_type;
    int              depth;
    VisualID         visual_id;
    int              layer;         /*image or overlay*/
    int              transparent;
    unsigned long    red_mask;
    unsigned long    green_mask;
    unsigned long    blue_mask;
    Visual           *visual;  } GRVisual;
```

*FIG. 4C*

```
/*****************************************************************
** The colormap object.  Describes a colormap which in turn     **
** depends on a visual.  This visual is specified in the        **
** GRVisual pointer in this structure.                          **
*****************************************************************/
typedef struct _GRColormap {
    unsigned long  type_attr;   /*For the union structure*/
    GRVisual       *my_visual;
    int            des;         /*Do we destroy this or not?*/
    Colormap       colormap;  } GRColormap;

/*****************************************************************
** GRWindow Structure:  The visual, colormap, parent must share **
** the same display and screen.  The window will get its visual **
** from the GRColormap parameter first, the GRVisual parameter  **
** second and the parent parameter last.                        **
*****************************************************************/

/***Tricky case:  When searching for ancestors for a window, and
since
    it is allowable to have my_visual, my_colormap and my_parent
fields
    filled, the search will always follow the parent field, which
must
    always be filled in except for the case of this window being
the root
    window, and then we will follow the visual field up***/

/***have the background be other than black or white, This number
happens to
    be one of the few colors that is constant across all visuals
except
    TrueColor12***/
#define GR_DEFAULT_WINDOW_BACKGROUND "#494949495555"

typedef struct _GRWindow
{
    unsigned long    type_attr;    /*For the union structure*/
    GRVisual         *my_visual;   /*Never NULL*/
    GRColormap       *my_colormap; /*Never NULL*/
    struct _GRWindow *my_parent;   /***Never NULL except if I am
Root Win***/
    union _GRObject  *my_path;  /***type GRObject * defines path of
inheritance***/
    union _GRObject  *my_size_metrics;/*Can be NULL*/
    union _GRObject  *my_attr_metrics;/*May or may not be NULL*/
    union _GRObject  *my_bs_window;  /* rendering backing store
obscuring window.  */
    int              x;
    int              y;
    unsigned int     width;
    unsigned int     height;
```

FIG. 4D

```
    unsigned int       border_width;
    unsigned int       depth;
    Window             win;

/* How many times this window has been DHA registered. */
    unsigned int       nDhaRegistrations;

/* Points to DHA registered window data structure in shared
  memory if the
     * window is local DHA.  Otherwise, this field is NULL.
     */
65  HpdhaWindowPrivPtr pRegWin;

} GRWindow;
                                                                    68
/***************************************************************************
 ** GRPixmap Structure:  We must have a depth for this to be          **
 ** interpreted properly.  A colormap is useful as well, so           **
 ** the colormap, window and pixmap is the order of the inher-        **
 ** itance of this structure.                                         **
 ***************************************************************************/
                     28    71
typedef struct _GRPixmap {
    unsigned long      type_attr;   /*For the union structure*/
    GRWindow     32    *my_window;  /***Never NULL, but may be
invalid***/        26
    GRScreen           *my_screen;  /*Never NULL, always valid*/
    union _GRObject    *my_path;    /***type GRObject * defines path of
inheritance***/
    union _GRObject    *my_size_metrics;
    unsigned int       width;
    unsigned int       height;
    unsigned int       depth;
    Pixmap             pixmap;    } GRPixmap;
                                 71
```

*FIG. 4E*

```
/*****************************************************************
**   The GC object draws to a drawable of a certain type. This   **
**   structure must have a drawable or a visual to inherit the   **
**   depth from.                                                 **
*****************************************************************/

/***Only one of either my_window or my_pixmap should to be
non-NULL,
      but may be invalid.  If both are NULL then my_path points to a
      screen object***/ typedef struct _GRGC {
    unsigned long    type_attr;    /*For the union struct*/
    GRWindow         *my_window;
    GRPixmap         *my_pixmap;
    GRScreen         *my_screen;   /*Never NULL, always valid*/
    union _GRObject  *my_path;   /***type GRObject * defines path of
inheritance***/
    union GRObject   *my_attr_metrics;

unsigned int     depth;
    GC               gc;  } GRGC;

/*****************************************************************
**   The GRObject structure is simply a union of all the above   **
**   X objects. The type field specifies what the object is.     **
*****************************************************************/ typedef union _GRObject {
    unsigned long    type_attr;    /*7 bottom bits are the type*/
    GRDisplay        grdisplay;
    GRScreen         grscreen;
    GRVisual         grvisual;
    GRColormap       grcolormap;
    GRWindow         grwindow;
    GRPixmap         grpixmap;
    GRGC             grgc;
    GRSizeMetrics    grsizemetrics;
    GRWinAttrMetrics grwinattrmetrics;
    GRGCAttrMetrics  grgcattrmetrics; } GRObject;
```

FIG. 4F

METHOD AND APPARATUS FOR TESTING X SERVERS

TECHNICAL FIELD OF THE INVENTION

The present invention relates to a method and apparatus for testing X Servers. More particularly, the present invention relates to a method and apparatus for testing X Servers which utilizes an object-oriented test harness which is polymorphic and hierarchical in nature and which encapsulates XLib routines in objects having hierarchical dependencies so that much of the detail of XLib routines is hidden from the test writer.

BACKGROUND OF THE INVENTION

The well known X Windows System™ is software that is implemented in graphics workstations to manage device inputs (e.g., mice and keyboards) and the graphics output being sent to the screen of the workstation. The X Windows System™ was developed in response to a need for a windowing system that is capable of working with a variety of different types of workstations. The X Windows System™ utilizes a programming model known as the client-server model. In the client-server model, the windowing software running on a graphics workstation is referred to as the X Server, which performs tasks requested by applications. These applications are referred to in the X Windows System™ as X Clients. The X Clients use the display of the graphics workstation. The X Client may be running on the workstation comprising the X Server or, alternatively, the X Client may be running on a remote computer that is connected to the workstation through a communication link.

Information communicated between the X Server and the X Client(s) is processed and communicated via a protocol known as the X Protocol. The X Windows System™ also comprises a library of routines known as XLib. The manner in which the X Server sends graphics output to the screen is controlled by the X Client, which calls XLib routines which, in turn, are converted into X Protocol requests. Upon receiving the X Protocol requests, the X Server outputs the appropriate graphics output to the screen of the graphics workstation. Tool kits, such as Motif, for example, allow XLib routines to be combined into basic building blocks called widgets using an object-oriented approach. These tool kits provide a higher level of abstraction and allow the programmer to create graphics output requests that utilize the widgets. The widgets are converted into X Protocol requests that are used by the X Server to generate graphics output to be sent to the screen.

Problems or defects in the X Server may cause the X Server to generate errors in an image being rendered to the screen by the X Server. There are some tools available that test the X Server. With these tools, tests make calls to Xlib to cause rendering by the X Server. After the rendering has been performed, the tests use the Xlib API to request the image. The X server uses internal information (i.e., software data) and external information (i.e., data from the graphics device) to return the requested image. However, this image may not be what was actually displayed by the graphics hardware. By using internal data, the X Server returns what it thinks the graphics hardware displayed, which is not necessarily what was actually displayed.

Accordingly, a need exists for a method and apparatus for testing X Servers which allow tests for testing X Servers to be easily written and which ensure precise testing of the X Server and the ability to easily analyze the testing results.

SUMMARY OF THE INVENTION

The present invention provides a method and apparatus for testing X Servers. The present invention comprises a testing system for testing X Servers. The testing system comprises a test harness that communicates with an X Server being tested to obtain the test results therefrom, an archive database for storing test archives to be used by the test harness for testing the X Server, a test result database for storing results of an X Server test, and, preferably, a viewing tool that presents the user with a result file which the user analyzes to determine the nature of a defect in the X Server.

In accordance with the preferred embodiment of the present invention, the test harness is object oriented and has a polymorphic and hierarchical structure. The basic units of the test harness are objects, such as display connections, screens, graphics contexts, pixmaps, colormaps and windows. Within a test context, each object encodes a unique hierarchy that indicates its dependencies on other test harness objects. These objects encapsulate Xlib routines and hide much of the detail of Xlib programming from the test writer, thus facilitating the test writer in writing tests. This feature of the present invention allows test writers to write tests for testing the X Sever without having to deal with Xlib syntax.

Once a test has been written, the test is run and the results of the test, if they are correct, are stored as an archive file in the test archive storage database for later use. When a test is run on an X Server, the test harness captures the image rendered to the screen by the X Server. The test harness then searches the archive database in a predetermined manner to obtain the appropriate test archive. The test archive is then compared to the test results. If the test failed, the captured test image and the test archive image are dumped to a test result storage database. A viewing tool then performs a difference of the captured image and the archive image and displays the captured image, the archive image and the difference image to the user via a graphical user interface (GUI). The GUI comprises features that allow the user to analyze the difference image to determine the nature of the X Server defect.

In accordance with the preferred embodiment of the present invention, the test harness obtains the test results from the X Server via a component that analyzes the hardware in the X Server which drives the screen to determine what was actually rendered. This feature of the present invention ensures that the test results utilized by the test harness reflect what the X Server actually rendered, instead of what the X Server "thinks" it rendered.

BRIEF DESCRIPTION OF THE DRAWINGS

FIGS. 4A–4F illustrate the header files of the test harness illustrated in FIG. 1, which are written in the C programming language.

DETAILED DESCRIPTION OF THE INVENTION

Figure 1:
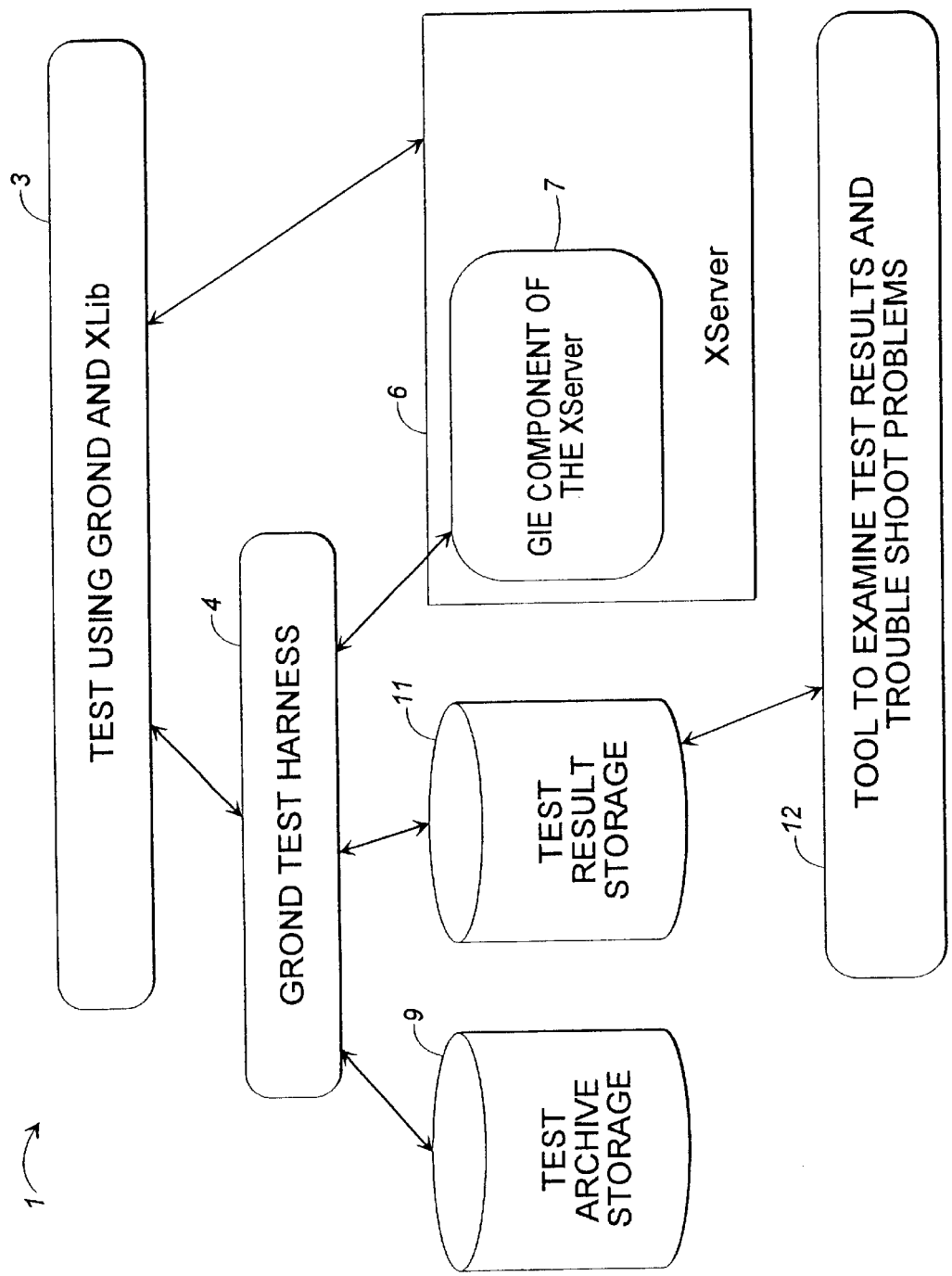
FIG. 1 is a block diagram of the testing system of the present invention for testing an X Server.

FIG. 1 is a block diagram illustrating the overall X Server testing system 1 of the present invention. The testing system 1 of the present invention allows a user to easily write tests 3 which are used to test the X Server 6. The testing system 1 of the present invention utilizes an object-oriented test harness 4 which is polymorphic in nature and which encapsulates XLib routines in objects, thereby hiding much of the detail normally associated with XLib programming from the test writer. The polymorphic nature of the test harness 4 is discussed in detail below with respect to FIGS. 4A–4F.

The test harness 4 communicates with the X Server 6 via a software component 7 comprised by the X Server 6 in order to test the X Server 6. The software component 7 functions as an extension of the X Server for passing test data relating to a test being executed by the X Server 6 to the test harness 4. This software component has been termed the "Get Image Extension" (GIE) because of its function. The test harness 4 obtains the test data from the GIE component 7 and compares the test data with expected test results stored in test archive storage device 9. The results of the comparison are then stored in test result storage device 11. A test analysis tool 12 obtains the test results from the test results storage device 11 and processes the test results into a display format which allows the test results to be easily examined by a user who utilizes the test results to troubleshoot problems with the X Server 6.

Figure 2:
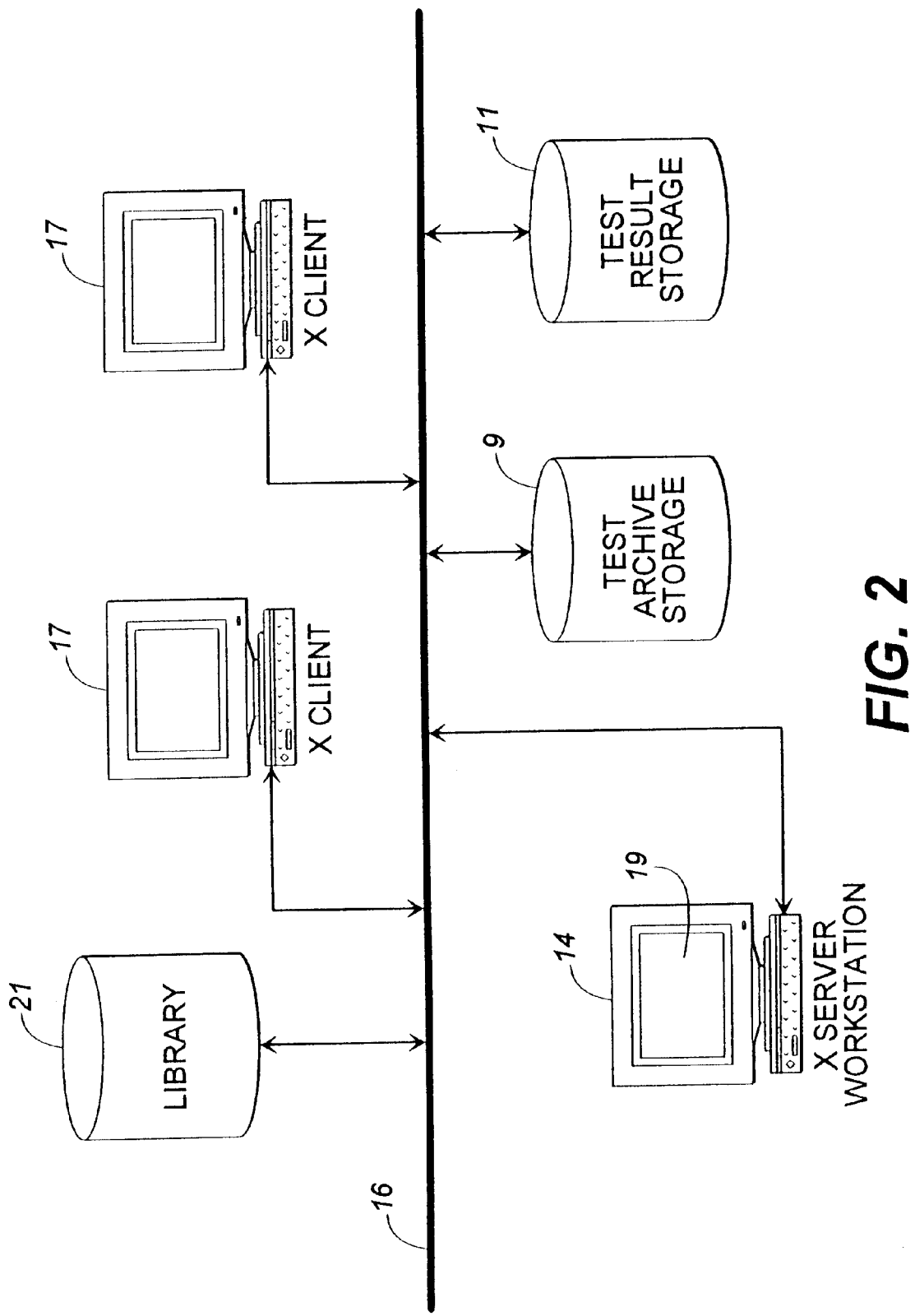
FIG. 2 is a block diagram illustrating the relationship between the X Server, the X Clients, and several databases, over which the testing system illustrated in FIG. 1 operates.

FIG. 2 is a block diagram illustrating the relationship between the X Server and the X Clients. The X Server 6 is comprised on a workstation 14 that communicates via a network 16 with one or more X Client machines 17. The network 16 may be, for example, an ethernet local area network (LAN). The X Client applications running on the machines 17 cause information to be output from the X Client machines 17 over the network 16 to the X Server workstation 14. Similarly, the information output from the X Server workstation 14 is sent over the network 16 to the X Client machines 17. The information communicated between the X Server workstation 14 and an X Client machine 17 via the network 16 is formatted and processed in accordance with the X Protocol, as will be understood by those skilled in the art. When the workstation 14 receives the X Protocol requests from the X Client machine 17, the X Server workstation 14 sends graphics output to the display 19 of the workstation 14. The workstation 14 can also run X Client applications, as will be understood by those skilled in the art.

The test harness 4 of the present invention is comprised as a file and is stored in a library 21. When a test writer is writing test applications to be run on one of the X Client machines 17, the test writer includes a call to the test harness file in the command line of the test application. When the test application is compiled, the executable will contain a call to the library 21 which will invoke the test harness 4. When the test application is run, the application will cause the X Server workstation 14 to display graphics output on the display 19 of the X Server workstation 14.

When the test harness 4 is invoked by the test application, the test harness 4 will search the test archive database 9 for the appropriate test archive and then compare the test archive with the test result information. At the time that the GIE component 7 extracts the test result information from the X Server 6, the test harness 4 converts the information into the test harness format for direct comparison with the archives. The test harness 4 compares this converted test result information to the test archive to determine whether the test passes or fails. If the test passes, an indication that the test passed is displayed to the test writer at the X Client machine 17, which may be the workstation 14 if the X Client application is running on the workstation 14. If the test failed, the test archive, the results of the test, and the difference between the test archive and the test results will be stored in test result storage database 11 for later analysis. The tool 12 for examining test results and trouble shooting X Server problems preferably is a software module that runs on the X Client machine 17 requesting the test. This analysis tool 12 preferably displays an image of the test results, an image of the test archive, and an image of the difference between the test results and the test archive to allow a user to view this data and to diagnose the X Server 6. The viewing tool 12 is discussed in more detail below with respect to FIGS. 6A and 6B.

The GIE component 7 of the X Server 6 obtains red, green, and blue (RGB) values from the X Server 6 independent of the depth of the X Server 6. In essence, the GIE component 7 removes the depth variable from the X Server data and returns RGB triplets to the test harness 4. Therefore, the test harness 4 preferably only utilizes the RGB data. The GIE component 7 communicates with the hardware of the X Server workstation 14 that drives the display 19 to determine what the X Server workstation 14 actually displayed on the display screen 19. By examining the hardware that drives the screen to determine what was actually displayed, rather than obtaining information directly from the X Server 6 as to what the X Server displayed, defects in the X Server 6 will not translate into inaccurate information being used by the test harness 4. The test harness 4 receives the information from the GIE component 7 and performs a bit-by-bit comparison, i.e., color by color, to determine whether the test passes or fails.

The GIE component 7 obtains information relating to the framebuffer contents, the hardware colormap contents, and the hardware attribute values. A value stored at an X,Y location in the framebuffer (not shown) corresponds to an index into the hardware colormap (not shown), which determines the color of the X,Y location on the screen. The hardware colormap is a lookup table for values in the framebuffer. There may be more than one hardware colormap and they may have different sizes. Therefore, the GIE component 7 is responsible for reporting back colormaps to the test harness 4 in an intelligent fashion, as will be understood by those skilled in the art.

The hardware attribute values are values that determine various hardware states. If more than one hardware colormap exists, the attribute values designate which colormap a particular pixel in the framebuffer uses. There may also be more than one framebuffer. An attribute value will determine which framebuffer is visible at any given pixel location. Therefore, for every pixel on the screen, a corresponding attribute value exists. All of this hardware information can be combined and used to determine RGB triplets for each screen pixel, which is what the GIE component 7 accomplishes. Therefore, when a test is run, the GIE component 7 reports to the test harness 4 what is represented in the hardware after or during the test. The test harness 4 can then compare this to the test archive to determine whether the test passes or fails.

The test harness 4 of the present invention is an application program interface (API) which enables test writers to easily write tests for testing the X Server 6. In addition, the test harness 4 provides other capabilities, such as storing archives in the test archive database 9, retrieving archives from the test archive database 9, obtaining results from the X Server 6 via the GIE component 7, and storing test results in test result database 11. As stated above, the test harness 4 is an object-oriented API that hides much of the detail of XLib programming from the test writer. This accomplished by encapsulating XLib routines in objects which are comprised in an object hierarchy and by using library calls to modify and query the XLib routines. It will be apparent to those skilled in the art that the databases 9, 11 and 21 may be contained in the same or a different storage device.

The Xlib routines are comprised in a file, which may be stored in library 21 or at any other location. Each of the test harness objects may call one or more of the XLib routines. The test harness objects are the basic units utilized by the test harness 4. These objects may correspond to, for example, display connections, screens, graphics context, colormaps, windows, and pixmaps, as well as lists of these objects. A test harness object may encode many other objects as well. For example, a test harness object that is a window may tell the test writer the identity of the X Display on which the window exists as well as the visual that the window is using. This feature of the present invention allows test writers to be concerned only about the XLib routines that are need for the particular test being written.

Most of the test harness objects are dependent on other test harness objects when they are created. Since this is the case, an inheritance tree has been designed to fill in any gaps existing when a test harness object is created. The inheritance tree utilized by the test harness 4 of the present invention implements defaults, direct inheritance, and indirect inheritance to specify a new test harness object and to detect when a conflict occurs so that the test writer will know where to look for the problem. This feature of the present invention allows the test writer to easily write X Server tests by using the test harness objects without having to grapple with XLib syntax. Therefore, the test harness 4 of the present invention defines an object hierarchy of well known XLib objects which is easy for test writers to work with and which guarantees proper use of XLib objects so that they work properly together.

Figure 3:
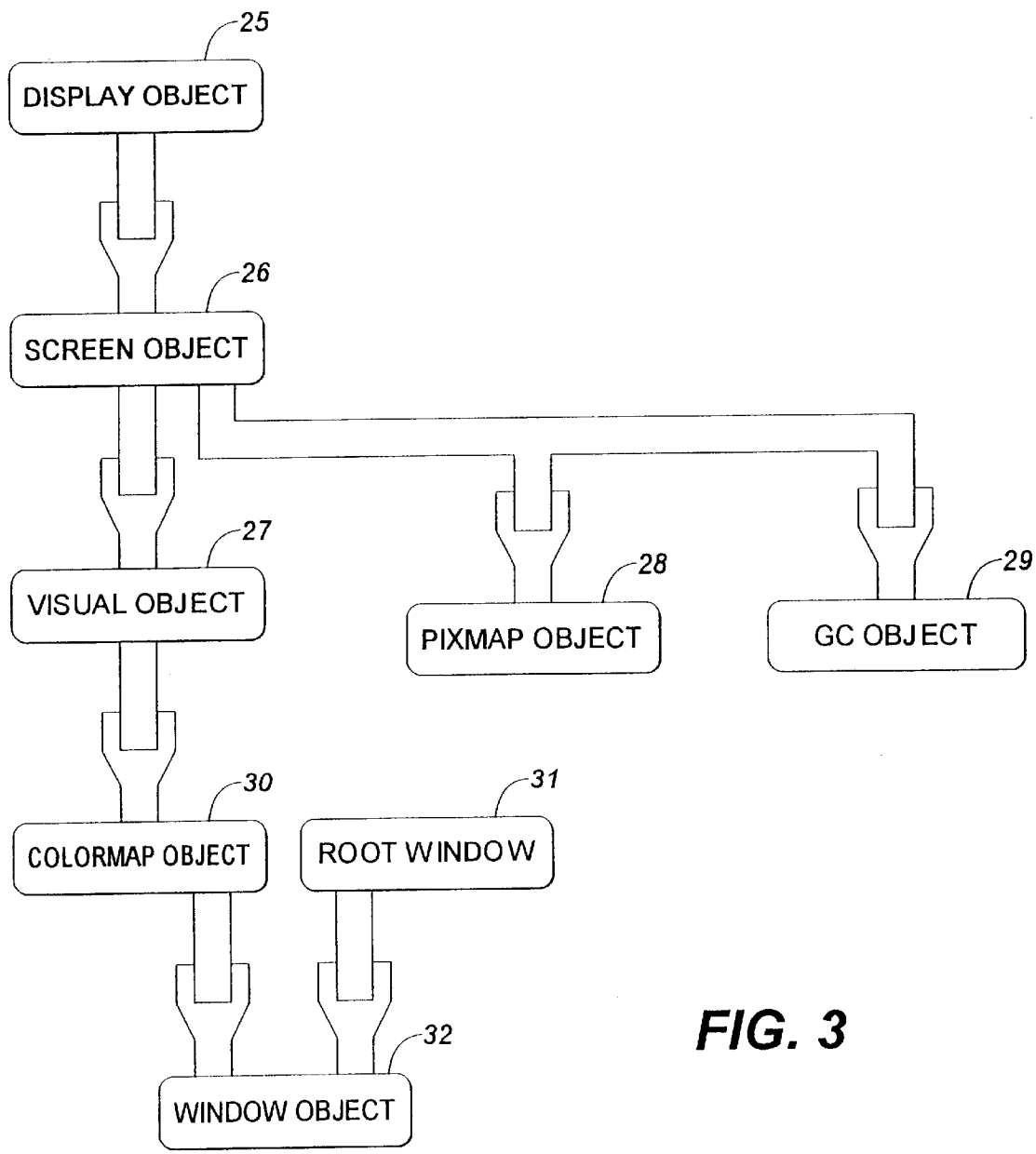
FIG. 3 is a diagram illustrating the object input dependencies of the objects utilized by the testing system illustrated in FIG. 1.

FIG. 3 is an illustration of the input dependencies of the objects used by the test harness 4 of the present invention, which demonstrates the polymorphic and hierarchical nature of the testing system 1 of the present invention. The display object 25 corresponds to the machine running the X Server 6. The display object 25 has no input dependencies. The screen object 26 corresponds to a graphics card or a monitor which is being driven by the X Server identified by display object 25. The X Server may have a plurality of screens, and thus a plurality of screen objects 26 can depend therefrom. For the purposes of illustrating the concepts of the test harness hierarchy of the present invention, only one screen object 26 is illustrated in FIG. 3.

Each screen has a pixmap, a graphics context (GC), and a visual associated therewith. Therefore, the visual object 27, the pixmap object 28 and the GC object 29 each have one input dependency, namely, the screen object 26. Generally, a pixmap corresponds to an image that is stored in memory and which cannot be seen until it is copied to a window. A GC operates on the pixmap to convert the pixmap into an image which is eventually displayed in the window. A visual is a description of the color capabilities of the display device corresponding to the display object 25. The visual describes the capability of the display to simultaneously display different colors. The visual also describes other capabilities of the display device such as, for example, a number of colormaps comprised by the particular display device. Each visual object 27 has one input dependency, namely, a screen object 26.

A colormap generally is a mapping from a number to a color. The colormap object 30 has one input dependency, the visual object 27. The window object 32 has two input dependencies, namely, the colormap object 30 and the root window 31. The root window is the parent window of the window object 32. The root window object 31 specifies the parent of the window object 32. If the parent of the window object 32 is not specified, then the root window of the default screen is used as the root window object 31. If the colormap object 30 does not specify the visual and colormap to be used, then the visual and colormap of the parent window is used.

The object hierarchy illustrated in FIG. 3 automatically uses defaults when the test writer does not select a particular value. For example, if the screen object 26 does not specify a display, then a default display is used. The test harness 4 of the present invention automatically determines whether a display has been specified and, if not, selects a default display to be used for the test. Similarly, if the visual object 27 does not specify a screen, the test harness 4 automatically uses a default screen. Therefore, performing a task, such as, for example, creating a window, is reduced to a minimum number of lines of code. For example, creating a window may be reduced to two lines of code with all of the objects used to create the window encapsulated in one object, as illustrated in the following example:

```
#include <Grond.h>
void main (int argc, char *argv[ ], char *environ[ ])
{
    GRObject *window;
/*Initialize Grond*/
    GR_Initialize (0, argc, argv, environ);
/*Create a window*/
    window = GR_AddWindow (Null, Null, Null, Null);
    exit (0);
}
```

The test harness 4 which has been developed for the testing system is called "Grond". Therefore, any reference to Grond herein denotes the test harness 4 of the present invention. However, it should be noted that the present invention is not limited to using Grond because Grond has many features which have been implemented merely for convenience which are not critical to the present invention. However, since Grond is the preferred implementation of the test harness 4 of the present invention, many of the features of Grond will be discussed herein for the purpose of providing a detailed understanding of the present invention.

In the above example, the variable window encapsulates all of the default variables that defined this X window. The default display, the default screen, the default visual and the default colormap are all used to create the window. Thus, the window object 32 encapsulates all of the objects above it through either direct or indirect dependencies. This feature of the present invention will become apparent from the discussion below of the header files shown in FIGS. 4A–4F.

FIGS. 4A–4F correspond to a portion of the test harness code, which is written in the C programming language. This portion of the code for the test harness represents the header files for the test harness API. The test harness code illustrated in FIGS. 4A–4F defines the object hierarchy of the code and illustrates the manner in which the polymorphic nature of the testing system 1 of the present invention is achieved. Persons skilled in the art will understand how to implement the invention in view of the discussion provided herein of these header files. Therefore, in the interest of brevity, only those sections of the test harness code that are believed to be necessary to enable persons skilled in the art to make and use the invention without having to engage in undue experimentation will be discussed. However, in order to ensure a complete understanding of the many features of the present invention, the manner in which a test writer utilizes the test harness API to write tests will also be discussed below with reference to specific examples.

As stated above, the test harness 4 developed for use with the present invention is named "Grond". In accordance with the present invention, one test object can assume the identity of another test object in its inheritance tree, thereby providing the testing system 1 of the present invention with polymorphic characteristics, as will be understood by those skilled in the art. As indicated in the comments in FIG. 4A designated by numeral 35, each of these objects, which may describe, for example, displays, screens, windows, etc., can occupy one of three states, namely, "not created", "implicitly created", and "explicitly created". The comments designated by numeral 35 explain each of these three states.

The code set forth in FIGS. 4A and 4B following the comments designated by numeral 35 in FIG. 4A and preceding the comments 39 in FIG. 4B relates to defining macros for the X Objects used by the test harness 4, defining macros which indicate whether the object has been implicitly created, explicitly created, not created, or currently being created, as well as to defining other macros. This section of the code also defines macros which indicate whether or not the object was created in the command line, as well as macros which indicate the presence or absence of the GIE component 7. It should be noted that although the testing system 1 of the present invention preferably utilizes the GIE component 7, it will be apparent to those skilled in the art that the present invention may also operates without the GIE component 7 by getting the test results directly from the X Server 6. However, getting the results by some other means or directly from the X Server 6 may not, in all cases, work as well as utilizing the GIE component 7 for obtaining the results from the X Server 6.

The code immediately following the comments designated by numeral 39 in FIG. 4B describes the display to be used by the X Server 6. The "typedef struct" declaration informs the compiler (not shown) that every time the compiler sees "GRDisplay", that name corresponds to a structure which contains everything within the brackets 40. The variables within the brackets 40 describe the display to be used by the X Server. The "type attr" variable 42 designates the type of the test object, which in this case is the display object 25. The "name" variable 43 informs the test harness of the name of the machine on which the display is located. The "*display" variable 44 is an X Windows structure contained in Xlib which designates the type of "Display". The display object 25 is assigned the name GRDisplay.

In FIG. 4C, the code following the comments designated by numeral 46 describe the structure of screen object 26 which has as its input dependency the display object 25 defined by the code in FIG. 4B. The screen object 26 is named GRScreen in the code and the variables within the brackets 47 specify the structure of the screen. It should be noted that the structure of the screen object 26 comprises the display object 25 and thus inherits the display object characteristics, as indicated by the variable "*my display", which provides the inheritance path for GRScreen. The other variables describe the name of the screen and other characteristics of the screen object, such as whether multiple screens are being used. The last variable within the brackets 47, "number" 48, is the X Windows structure defining the type for GRScreen.

FIG. 4C also illustrates the code defining the visual object 27, named GRVisual. As indicated in the comments 51, the visual object 27 describes a visual present on the screen defined by the screen object 26. The variables contained within the brackets 53 describe the specifications for the visual object 27. It should be noted that the structure of the visual object 27 comprises the screen object 26 and thus inherits the screen object characteristics, as indicated by the variable "*my screen", which provides the inheritance path for GRVisual.

The colormap object 30 is described at the top of FIG. 4D. Below the comments 56, the structure of the colormap object 30 is specified by the variables contained within the brackets 59. The colormap object 30 is named GRColormap in the test harness code. It should be noted that the structure of the colormap object 30 comprises the visual object 27 and thus inherits the visual object characteristics, as indicated by the variable "*my visual", which provides the inheritance path for GRColormap.

Below the code defining the colormap characteristics are comments 61 describing the window object 32. Additional comments 63 provided below comments 61 describe the test harness 4 and the manner in which it searches for ancestors for a window. Below the comments 63, the window object is defined in terms of its structure. The window object 32 is more complicated than the other objects. As shown in the variables contained within brackets 65 in FIGS. 4D and 4E, the window object 32 has as its input dependencies, the colormap 30 and the root window object 31. As stated in comment 61, the window object will obtain its visual specification from the colormap object first if available, then from the visual object 27 second, and then from the root window 31 last. Therefore, the GRVisual object 27 is also contained in the arguments defining the window object 32. This is because two inheritance paths can coexist, one to the colormap object and the other to a parent window. Both of these inheritance paths have their own visuals and colormaps, which can be different. Therefore, the GRVisual 27 is defined within the structure of the window object 32 to ensure that the correct visual for the window is used.

FIG. 4E illustrates the structure of the pixmap object 28. The comment 68 immediately preceding the code defining the pixmap structure explains the inheritance of the pixmap structure. As indicated by the arguments contained within the brackets 71, the structure of the pixmap object 28 comprises the screen object 26 and thus inherits the screen object characteristics, as indicated by the variable "*my screen", which provides the inheritance path for GRPixmap. The structure of the pixmap object 28 also comprises the window object 32 and thus inherits the window object characteristics. This is because, in the X Windows system, a pixmap can be created from a window and by incorporating GRWindow into the structure of the pixmap object 28, the depth of the pixmap is implied.

FIG. 4F illustrates the portion of the code describing the GC object 29, named "GRGC". As can be seen from the variables contained within the brackets 76, the structure of the GC object 29 comprises the screen object 26 and thus inherits the screen object characteristics, as indicated by the variable "*my screen", which provides the inheritance path for GRGC. The structure of the GC object 29 also comprises the window object 32 and the pixmap object 28. The window object 32 and the pixmap object 28 do not have to be comprised within the structure of the GC object 29, but if they are not, they will have to be derived by the test harness 4.

The test harness code which defines the union of all of the test harness objects is also illustrated in FIG. 4F below the code portion for the GC Object 29. This portion of the code, designated by numeral 80, creates a union between all of the test harness objects, as will be understood by those skilled in the art. The inheritance of the test objects is defined in the header files in the manner discussed above by placing in each header file a pointer to the object from which the object defined by the header file depends, which links the data structures together. However, each instance of an object may have a unique inheritance path. For example, once a first window has been created, other windows can be created using the first window. In order to ensure that the test harness code is provided with this ancestry information, the header files for the screen object 26, the window object 32, the pixmap object 28 and the GC object 29 contain inheritance path information, as indicated by the "union_GRObject" variables. The "typedef_union_GRObject" function shown in FIG. 4F followed by the list 80 of the test objects then provides the test harness with its polymorphic characteristics, as will be understood by those skilled in the art.

When the test writer writes tests for testing an X server, the polymorphic nature of the test harness 4 facilitates the test writing task in that the test harness 4 automatically keeps track of the object dependencies and inheritance paths. Also, since the test harness objects incorporate the Xlib routines, the test writer is not confronted with the task of having to deal with Xlib syntax to write X Server tests. The advantages of this feature of the present invention will be readily apparent to those skilled in the art. These advantages will become more apparent from the discussion provided below of the test harness API used by a test writer to write X Server tests.

Figure 5:
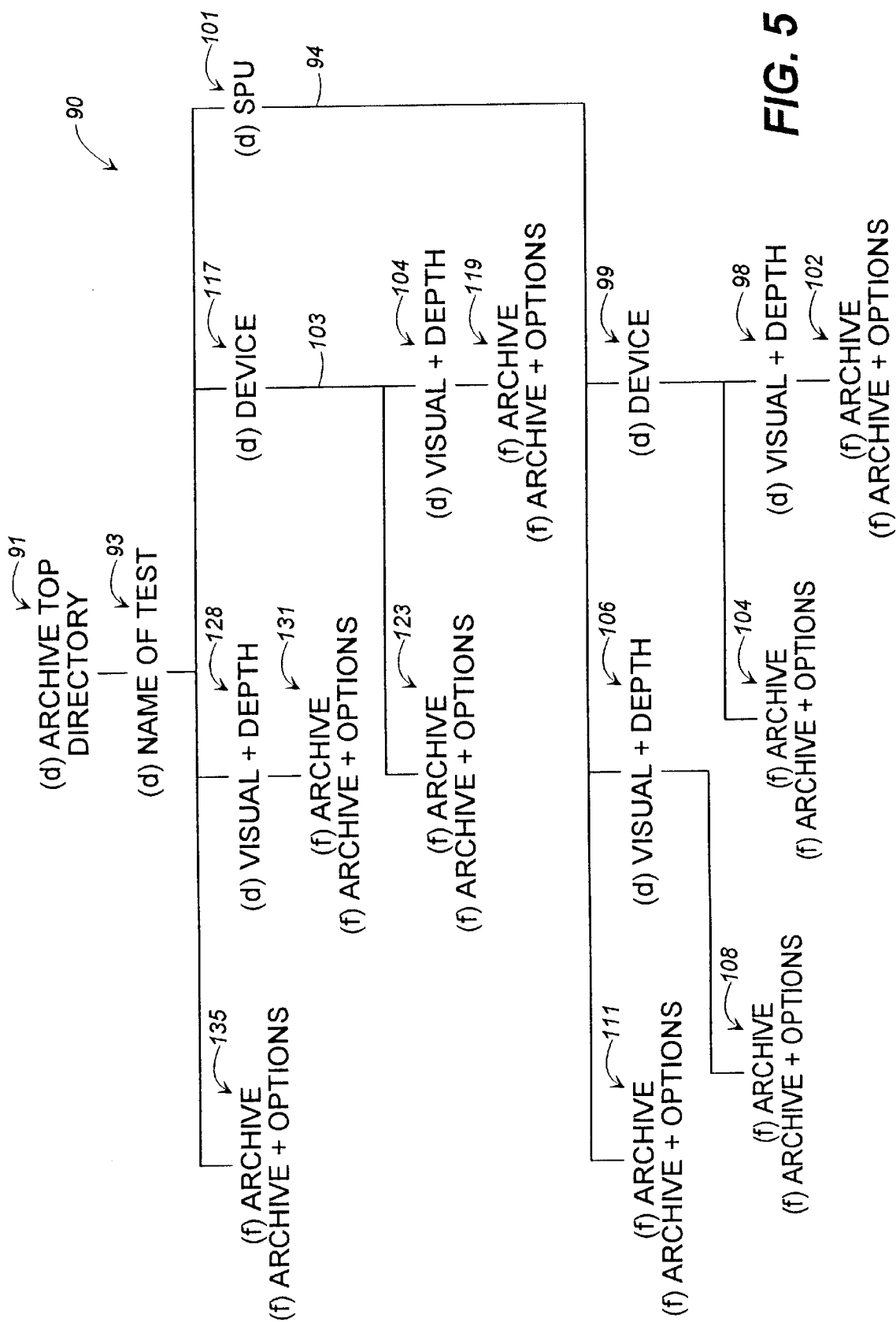
FIG. 5 is a diagram illustrating the archive directory tree used by the test harness shown in FIG. 1 to compare the results of a test with a reference stored in the test archive storage device shown in FIG. 1.

FIG. 5 is a diagram illustrating a tree directory 90 for the archive path used by the test harness 4 to create new archives and to search for previously created archives to be compared to test results. The test harness 4 of the present invention was designed to allow for fast creation of tests used to test the X Server. Once created, the archives are used in testing to compare an expected result to a tested result. The test harness 4 incorporates such a scheme for both images and texts. All text archives are simply pure ASCII files without any changes to the files, which allows standard UNIX file comparison tools to be used for comparing a tested result with an expected archived result. However, the graphic archives have a different format, as described below in more detail.

While the format of the file content of an archive is important, the path and filename for the archive are equally important. The archive path of the test harness 4 of the present invention was designed to allow archiving based on the machine parameters and the X Server window parameters. The filename used for the archive is intended to reflect the image rendered and parameters that affect the rendered image, and not the window parameters. A full path listing for a single archive source is provided below to exemplify the archiving features of the present invention.

Typically, only one or two archives are needed per test, but in order to allow any test to be written, a complete hierarchy is defined for the archives. In FIG. 5, "(d)" denotes a directory whereas "(f)" denotes a file. The top directory 91 is specified by the user on the command line of the test being written. If the top directory 91 is not specified on the command line, then the directory used by the test harness 4 as the top directory is the local working directory. This aspect of the archiving scheme allows several different archive sources to be utilized and provides localization of archiving and archive searching.

The Name 93 of a test is specified by the writer of the test. This can be hard-coded or commanded by the command line. This means that the test writer has the option of passing a hard-coded string to the Grond API that defines the test name, or the test writer may allow the name to be generic by allowing a test-defined command line option to specify all or part of the test name. This is similar to adding a version option which would be preferred, but without limitations being placed on the test writer. It should also be noted that, while Grond hides a lot of the Xlib interface, it also allows the test writer to use the XLib API at any time the test writer wishes. This feature of the present invention simplifies the redundant calls made to Xlib while allowing the user to access all aspects of Xlib.

In either case, the test name 93 points to a directory tree 90 used to determine the location of the archive. The remaining branches of the directory tree 90 are parsed differently depending on whether an archive is being created or an archive is being sought for verification of test results. When creating an archive, each path must be specified on the command line. When using an archive to compare it to test results, the directory tree 90 is searched from the bottom up. Prior to describing this approach, descriptions of the various directories will be explained.

The term "Archive" is used to designate a file containing an archive. The term "Archive+Options" is used to designate a file containing an archive that has been appended with an option to differentiate it from other archive files. These options are specified on the test command line invocation. The term "Visual+Depth" describes the visual and depth characteristics of a window. In the X Server, windows can be created for rendering. These windows may have different visual and depth characteristics. A different directory can exist for each unique visual and depth. For example, a directory for a Visual+Depth might specify a PseudoColor Depth 8 and a DirectColor Depth 24.

The term "Device" is used to designate a graphics device being used by the X Server to render to the monitor. A directory can exist for each unique graphics device. The term "SPU" is used to designate the computer type on which the X Server is executing. There can be a different directory for each type of computer.

In order to obtain an archive for comparison with test results, the test harness 4 searches the directory tree 90 from the bottom of the directory tree 90 to the top of the directory tree 90. Once the directory tree 90 has been searched and an archive file having the correct filename has been found, that archive is used by the test harness 4 for the comparison with the test results. Using the term "TOPDIR" for the top directory 91 and "RENDER" for the name 93 of the test, the following list gives the order for searching for an archive:

(1) TOPDIR/RENDER/SPU/Device/Visual+Depth (2) TOPDIR/RENDER/SPU/Device (3) TOPDIR/RENDER/SPU/Visual+Depth (4) TOPDIR/RENDER/SPU (5) TOPDIR/RENDER/Device/Visual+Depth (6) TOPDIR/RENDER/Device
(7) TOPDIR/RENDER/Visual+Depth
(8) TOPDIR/RENDER The search first searches the render directory 93 to find the name of the test. The search then follows the SPU branch 94, down to the visual+depth directory 98 and searches the archives files 102 for the test archive. If the correct archive cannot be found in the archives file 102, then the test harness 4 searches the archives files 104. If the correct archive file is not found in archive files 104, the test harness 4 searches the archives files 108. If the correct archive file is not found in archives files 108, the test harness 4 searches archives files 111.

If the correct test archive file is not found in archives files 111, the search proceeds down branch 103 and the archives files 119 are searched for the correct test archive file. If it is not found in the archives files 119, the test harness 4 searches the archives files 123 for the correct test archive. If the correct test archive file is not found in archives files 123, the test harness searches archives files 131. Finally, if the test archive file is not found in archives files 131, the test harness searches the archives files 135 for the test archive. If the test archive is not found in the archives files 135, the archive has not yet been created.

The archives initially must be created and stored in the archive storage database 9. Typically, the archives are created by users who run tests which test the X Server. These users are capable of determining when the correct results have been produced by the X Server. The correct results are then archived by naming them and saving them at the appropriate location in the directory tree 94, as will be understood by those skilled in the art.

The archive file name is formatted to include a unique name and options to enable the implementation of various controls while using the same test. The format of the file name is as follows:

name_of_test.version:render_value:option:option: . . .

The name of the test corresponds to the name of a file in the directory 93 below the archive top directory 91. The version of the test is specified on the command line for both archiving and usage of the archive file. The render_value specifies a random seed value used to perform rendering. This random seed is used by the test writer during creation of a test and therefore must be used by the test archive being compared to the test results. By default, this value is initialized by the test harness 4. The test writer can change this value on the command line. If the test writer chooses (as is most often the case), the rendering can use a random order based on this seed value.

Other options are implementation-dependent options. For example, line width is an implementation-dependent option which corresponds to the maximum random line width to be used when drawing any kind of line (e.g., dashed lines, solid lines, rectangles, polygons, etc.). Another example of an implementation-dependent option is clipping type. This option specifies the type of clipping used to generate the archive. Rendering can be done while using various clipping mechanisms.

As stated above, all text archives are pure ASCII content, which allows standard text comparison tools to be used for comparing archives with test results. However, graphical archives are formatted in a special manner. The first line of the graphics file describes whether the file is in ASCII format or binary format. A single byte defines the format type of the file. An "a" in ASCII indicates that the file is in the ASCII format and a "b" in ASCII indicates that the file is in the binary format. Currently, only the ASCII format has been implemented due to the fact that the file contents are easy to view and understand when implemented in ASCII. However, it will be apparent to those skilled in the art that the present invention is not limited to any particular file formats.

The second line of the file contains the name of the archive as specified by the test harness 4. The third line of the file designates the SPU (machine type) used to create the archive. The fourth line of the file designates the visual and depth of the window used for rendering the test. The fifth line of the file designates the graphics device used to create the archive. The sixth line of the file designates the time and date of archive creation. The seventh line of the file contains the test harness random seed value used during the test creation. This random seed value is different from the one used for rendering. This seed value allows the exact test execution to be determined and is used for options that do not affect any rendering, such as window position, for example. The eight line of the file contains the rendering seed value.

The ninth line of the file contains the window dimensions of the X Server in terms of x, y, width, and height. The tenth line of the file contains the expected test window dimensions in terms of x, y, width, height. The eleventh line of the file contains the "Max Line Width" option value. The twelfth line of the file contains the "Clipping type" option value. The first line after the options contains the Checksum of the entire file. The checksum/cyclic redundancy check (CRC) calculations are contained within the test harness executable to guarantee that calculations are always computed in the same manner. The checksum and the CRC are used if the entire image is being compared. This minimizes the amount of time spent calculating the expected results.

The second line after the options contains the CRC value used in the checksum. The third line after the options defines the format of the image so that formats other than ASCII and binary formats can be used as the formats for the graphical information. The fourth line after the options designates the image width, i.e., the number of columns comprised by the image. The fifth line after the options designates the image height, i.e., the number of rows comprised by the image. The sixth line after the options is used for column identification. This is a column number identification (i.e., a counter) facilitates the ASCII viewing of the information. The seventh line after the options defines the row number and data for the first row in ASCII RGB format hexadecimal values. The eighth line after the options contains the row number and data for the second row.

The following is a simple example of an archive file:

```
----------------------------------------File----------------------------------------
a
Name: solidpoly
SPU used to create the file: 715-64
Visual and Depth: PseudoColor.8.Image.NoTransparent
Device: Timber
Date and Time: Mon Jan 29 20:28:25 1996
GR_Initialize random seed value: 1903150144
Rendering Random Seed Value: 100
X Window Dimensions x, y, width, and height: 789 692 3 3
GIE Window Dimensions x, y, width, and height: 789 692 3 3
Max Line Width: 10
Clipping: False
Checksum: 33557940
CRC: 18428
GIE Image
GIE Image Width: 3
```

-continued

```
GIE Image Height: 3
      columns:        00000000 00000001 00000002
row   00000           00rrggbb 00rrggbb 00rrggbb
row   00001           00rrggbb 00rrggbb 00rrggbb
row   00002           00rrggbb 00rrggbb 00rrggbb
------------------------------------File------------------------------------
```

The rrggbb values represent the intensities of 0–255 for the colors red, green, and blue.

It should be noted that the archive files can have any desired format. The format discussed above is only one of many ways of formatting the archive files, as will be understood by those skilled in the art. Therefore, the present invention is not limited with respect to the format or content of the archive files.

When the testing system 1 of the present invention compares an image that has been generated by the X Server 6 to an archive file retrieved from the archive storage device 9, the testing system is capable of producing a results file that shows differences between the test result and the expect results from the archive. The format of the results file will now be discussed in detail.

A single byte designates the file format for the results file. An "a" designates an ASCII format and a "b" designates a binary format. If this line is left blank, the default of ASCII is assumed. The file contains an archived image represented by archive image information, a test image represented by test image information from the executed test, and a comparison image represented by comparison image information resulting from comparing the archived and test images. Each image has the following format:

The first line of the image contains a comment as to the type of image, i.e., whether the image is an archive image, a test image, or a comparison image. If the file corresponds to a comparison image, the operation used to differentiate the image is also defined. These operations include XOR, AND, OR, SUM, DIFF, NOR, etc. This information relating to the operation used is optional. If it is absent, then ASCII is assumed.

The second line of the file designates the source of the image. GIE, which generates an ASCII format, is the preferred source. However, other image formats may be used as well, including standard types, as will be apparent to those skilled in the art. The third line of the image file designates the image width, i.e., the number of columns comprising the image. The fourth line of the file designates the image height, i.e., the number of rows comprising the image. The fifth line of the file contains a column identification. This is a column number identification facilitates the ASCII viewing of the information.

The sixth line of the file contains the row number and data for the first row in ASCI RGB format hexadecimal values. The seventh line of the file contains the row number and data for the second row.

Below is an example of a results file:

```
------------------------------------File------------------------------------
image 1 data:archived image
GIE Image
GIE Image Width: 3
GIE Image Height: 3
      columns:        00000000 00000001 00000002
row   00000           00rrggbb 00rrggbb 00rrggbb
row   00001           00rrggbb 00rrggbb 00rrggbb
row   00002           00rrggbb 00rrggbb 00rrggbb
image 2 data:created image
GIE Image
GIE Image Width: 3
GIE Image Height: 3
      columns:        00000000 00000001 00000002
row   00000           00rrggbb 00rrggbb 00rrggbb
row   00001           00rrggbb 00rrggbb 00rrggbb
row   00002           00rrggbb 00rrggbb 00rrggbb
GIE Image Difference (XOR)
GIE Image Width: 3
GIE Image Height: 3
      columns:        00000000 00000001 00000002
row   00000           00rrggbb 00rrggbb 00rrggbb
row   00001           00rrggbb 00rrggbb 00rrggbb
row   00002           00rrggbb 00rrggbb 00rrggbb
```

The viewing tool 12 shown in FIG. 1 reads these files and displays them to the user. Therefore, the user can look at these image files and determine whether the test passed or failed. The user can also determine where the mismatch occurred so that the defect in the X Server 6 can be pinpointed.

Figure 6A:
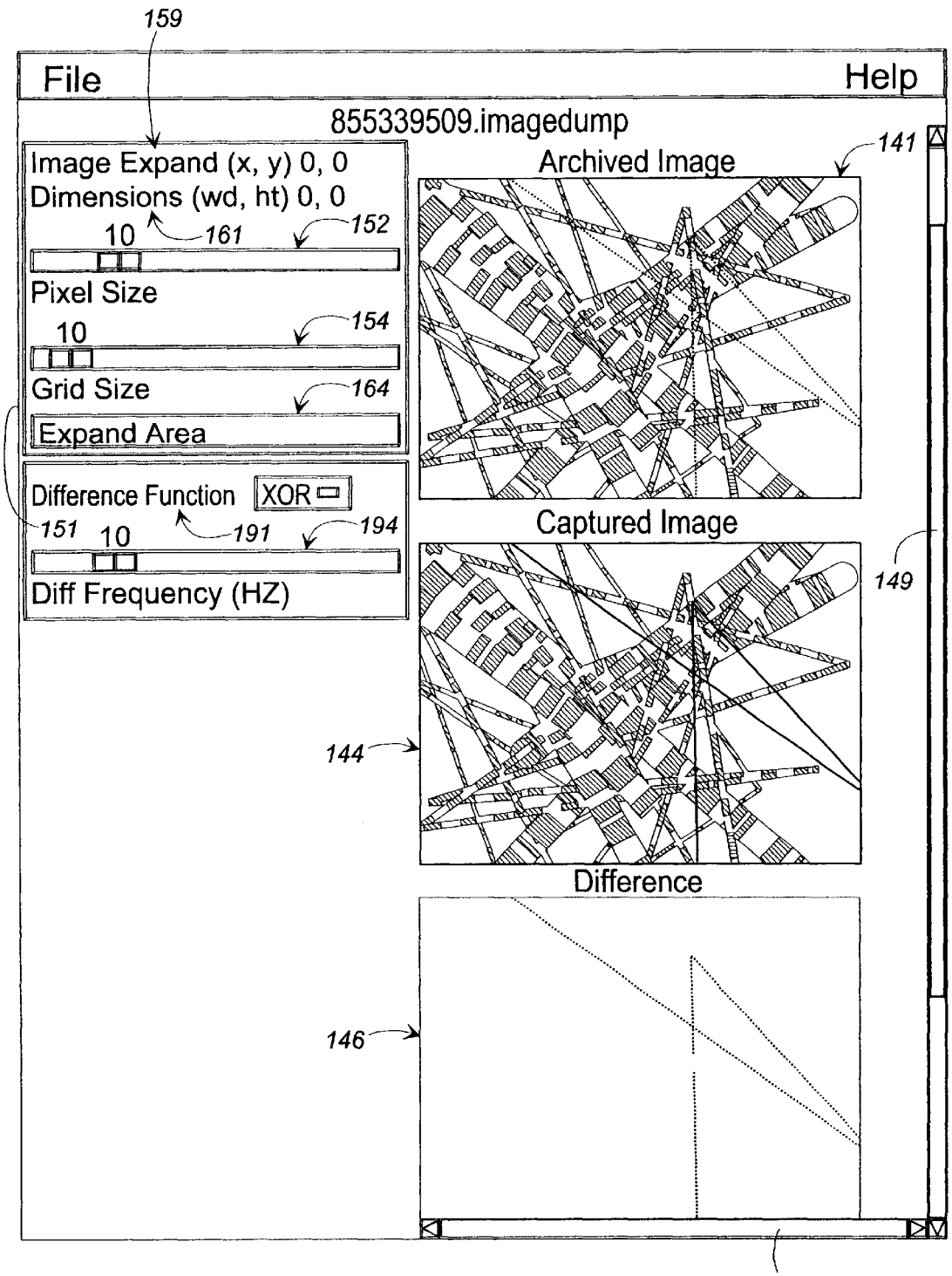
FIG. 6A is a graphical user interface generated by the viewing tool shown in FIG. 1 which illustrates an archived image, a captured image generated during a test of the X Server, and a difference image of the archived and captured images.

The viewing tool 12 preferably is invoked by the test harness 4 after the test has been executed. The viewing tool 12 obtains the archived image and the test results from the test harness 4 and generates the results file discussed above. The viewing tool 12 presents a graphical user interface (GUI) to the user, which is shown in FIG. 6A in Graphics Interchange Format (GIF). The top image 141 presented by the GUI is the archived image. The middle image 144 is the captured image obtained from the test. The bottom image 146 is a difference image which the viewing tool 12 obtains by performing an XOR of images 141 and 144. As stated above, functions other than the exclusive OR function may be performed by the viewing tool 12 as well.

Figure 6B:
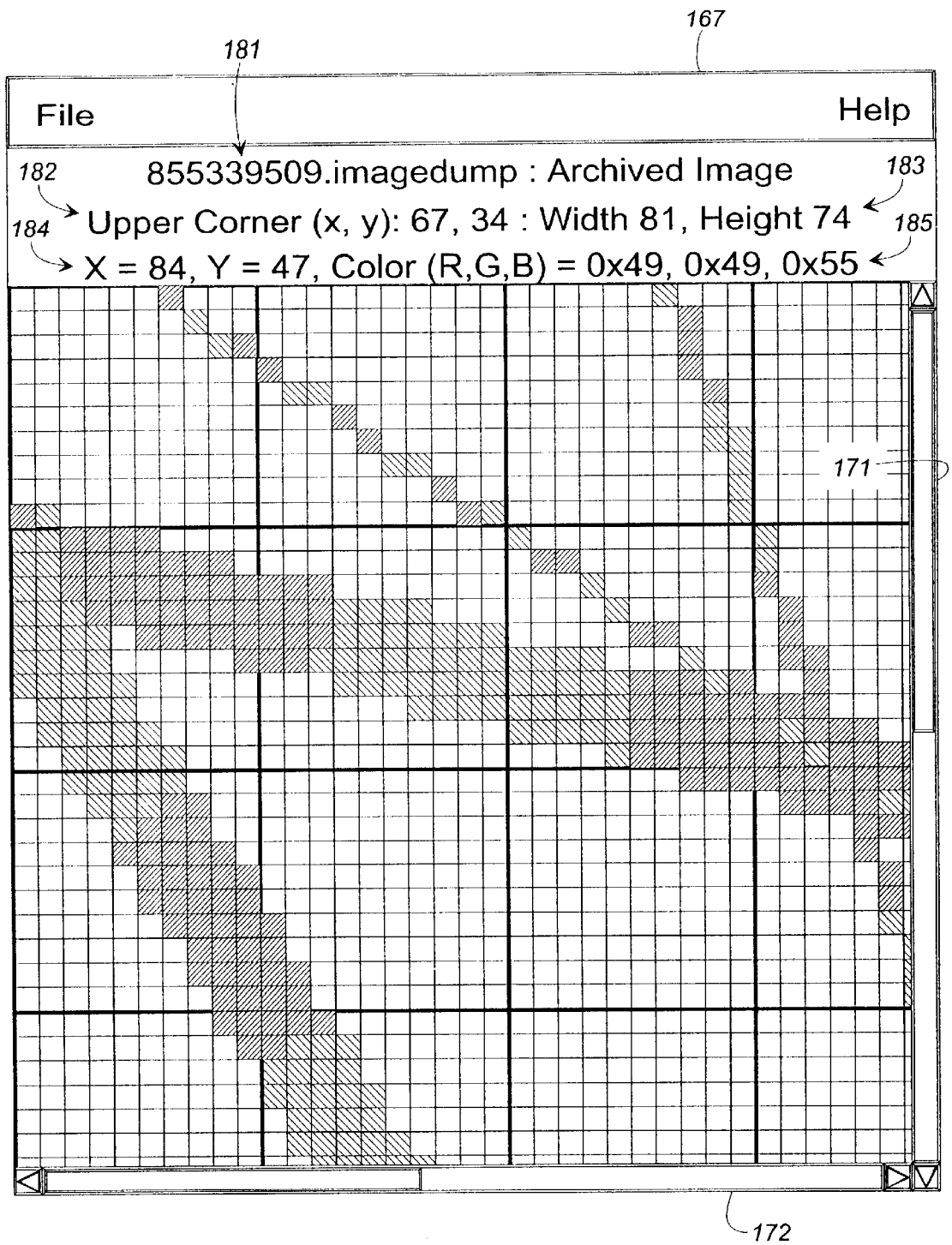
FIG. 6B is an enlarged view of the difference image shown in FIG. 6A which may be used to debug a defect in the X Server being tested.

The scroll bars 149 and 150 allow the user to scroll the three images. The control area 151 presents the user with tools that assist the user in determining why a test failed. Two control boxes 152 and 154 provide a sophisticated zoom function that the upper box 152 controls. The slider bar 152 controls the size to which the pixels will be zoomed, while the lower slider bar 154 controls the number of pixels between grid bars. The settings shown indicate that the image has been zoomed by a factor of 10. The top two labels "Image Expand" 159 and "Dimensions" 161 indicate the selected area in the image to be zoomed. The "expand" button 164 causes the zoom function to be executed and brings up the zoomed image in another window, which is illustrated in FIG. 6B.

The new window 167 comprises diagnostic information at the top of the window 167 and scroll bars 171 and 172 along the right side and bottom, respectively. The diagnostic information includes an identifier 181 of the dumped image, X and Y coordinates 182 of the pixel in the upper left-hand corner of the image, and the width and height 183 of the image contained in the window 167. In addition, the diagnostic information includes the X and Y coordinates 184 and the RGB color values 185 of the pixel on which the pointer (not shown) is positioned. The scroll bars 171 and 172 can be used to scroll the image.

The difference function 191 shown in FIG. 6A allows the user to select the difference function to be used, e.g., XOR, AND, OR and DIFF. The default function is the XOR function. The DIFF function does not perform a logical function, but causes the archived image to flash over the captured image, which has the effect of highlighting the difference by giving them "motion". The sliding bar 194 controls the frequency of the flashing in Hertz.

The manner in which the viewing tool 12 accomplishes all of the functions discussed above will not be provided herein because persons skilled in the art will understand how these functions can be implemented in view of the discussion of the present invention provided herein. It will also be apparent to those skilled in the art that the viewing tool 12 may be provided with different or additional functions if desired. The functions discussed above are sufficient to allow a user to easily identify defects in the X Server 6. However, it will be apparent to those skilled in the art that the present invention is not limited to these functions.

As stated above, the test harness 4 of the present invention is an API that can be used by test writers to write tests for testing X Servers. A few examples demonstrating the manner in which the API may be used by test writers to conveniently write tests for testing X Servers will now be provided. The test harness will be referred to as Grond because this is the name that has been chosen for the current implementation of the API, and the API code and the comments throughout the code use this term to describe the test harness 4.

As stated above, the test harness of the present invention has been designed to hide much of the detail of Xlib programming from the test writer. This is accomplished by encapsulating much of the Xlib detail in the test harness 4 and in the test archive database 9 and using calls to modify and query the Xlib data. Grond uses an object-oriented approach to the X Libraries. Every piece of data that Grond uses is an object. Preferably, the user has no access to the insides of the objects except through convenience functions defined in Grond. This allows the Grond developers to modify and enhance Grond without breaking existing Grond applications. It also provides a well-defined interface to Grond operations so that test writers become accustomed to a single paradigm rather than a constantly changing one.

One of the primary features achieved by the test harness of the present invention is that it allows the test writer to concentrate on writing tests rather than worrying about the syntax of Xlib. This is accomplished by defining an object hierarchy of well known Xlib objects. This hierarchy also guarantees proper use of Xlib objects so that they work together properly. This hierarchy was discussed above with respect to FIG. 3. In accordance with this hierarchy, Grond uses the same name for all objects, which is GRObject. This is also how the Xlib information is represented by Grond. For example, in accordance with the present invention, if an object is a window, that object also contains all of the Xlib information for that window, such as the colormap, the visual, screen and display for the window. The X Client application is no longer responsible for these things since the object encapsulates them. Convenience functions are also provided which extract the desired data from the GRObject.

This feature of the present invention is utilized to define object inheritance. Within the Grond test harness, it is possible to use inheritance to specify new object instances from existing ones, thus re-using the desirable traits that an object may have. An example of this would be creating another window from an existing one. For example, if a window has already been created that has much of the structure that the user wants a new window to have (e.g., screen, colormap, etc.), that window can be used to create the new window. The size and location of the new window, or windows, can be changed by simply passing the window-creating routine the GRObject pointer for the existing window and also a size metrics pointer for the new location and size. Once this is done, the new window is automatically created. Furthermore, the new window has exactly the same traits as the first window, except for size and location. The following is an example of a routine that utilizes an existing window called "GoodHappyWindow" to create other windows:

```
#include "Grond.h"
void main(int, char* [ ], char*[ ])
void main (int argc, char *argv[ ], char *environ[ ])
{
    GRObject *GoodHappyWindow, *InheritedWindow;
    GRObject *NewSizeMetrics;
/***Grond must always be initialized/
    GR_Initialize (o, argc, argv, environ);
/*Create Good, Happy Window*/
    GoodHappyWindow = GR_AddWindow (NULL,NULL,NULL,
    NULL);
    GR_MapWindow (GoodHappyWindow);
/*Create New Size Metrics*/
    NewSizeMetrics = GR_AddSizeMetrics(50, 50, 300, 600, 0);
/*Create inherited Window*/
    InheritedWindow = GR_AddWindow(GoodHappyWindow, NULL,
NewSizeMetrics);
    GR_MapWindow(InheritedWindow);
/*Do Test Stuff*/
    GR_Close(GRPASS);
    exit(0);
```

The following example creates, maps and destroys five windows and is intended to demonstrate the ease with which windows can be created using the test harness of the present invention.

```
#include "Grond.h"
void main(int, char *[ ], char *[ ]);
void main(int argc, char *argv[ ], char *environ[ ])
{
    GRObject *pwindow;
    int i;
/* Simple test of creating a default window on the
    * default screen and display.***/
    GR_Initialize(0, argc, argv, environ);
    for(i=0; i < 5; i++)
    {
        pwindow = G_AddWindow(NULL, NULL, NULL, NULL);
        GR_MapWindow(pWindow);
        XFlush(GR_IsDisplay(pWindow));
        sleep(1);
        GR_SubtractWindow(pwindow);
        XFlush(GR_IsDisplay(pWindow));
    } /for/
    GR_Close(GRPASS);
    exit(0);
}   /*main( )*/
```

The following example is a more complex example which demonstrates some of the more advanced features of the test harness 4 of the present invention, such as diagnostic output and the use of lists in looping, which cause new screens and visuals to be created when windows are created.

```
1 #include "Grond.h"
2 void main(int, char *[ ], char *[ ]);
3 void main(int argc, char *argv[ ], char *environ[ ])
4 {
5       GRObject **pTestDisplay,
6              *pDisplays,
7              *tmpList,
```

-continued

```
8               *pScreens,
9               *pScreenItem,
10              *pVisual,
11              *pWindow;
12      char    *pDisplayName;
13      int     i;
14      GR_Initialize(0, argc, argv, environ);
15      /* Loop through each display in the command line or
16      the display identified by the environment variable.
17      */
18   for (pTestDisplay  GR_ListAllClOfType(GR_DISPLAY,
19                              &pDisplays,
20                              (int) 0);
21        pTestDisplay != (GRObject **) NULL;
22        pTestDisplay  GR_ListNextItem(pDisplays))
23{
24      /* identify the display being tested to the log file.
25      pDisplayName = GR_IsDisplayName(*pTestDisplay);
26      GR_WriteToLogfile(2, argv[0],
27              "Testing display:%s",
28              pDisplayName);
29   free(pDisplayName);
30      /* Get a list of the display's available screens to test. T
31      * screen are the screens identified by the command line or
32      * environment.
33      */
34      GR_ListAllClOfType(GR_SCREEN, &tmpList, 0);
35      GR_ListChooseUsesType(tmpList,
36              *pTestDisplay,
37              GR_DISPLAY,
38              &pScreens,
39              0);
40      GR_ListDestroy(tmpList);
41      /* Loop through each screen.*/
42      for (pScreenItem  GR_ListFirstItemValue(pScreens);
43          pScreenItem != NULL;
44          pScreenItem = GR_ListNextItemValue(pScreens))
45{
46      /* Get a visual from the screen. A Random visual.*/
47      pVisual = GR_AddRandomVisual(pScreenItem,
48              -1 /* class*/
49              -1, /*layer*/
50              -1, /* transparency*/
51              -1); /* depth*/
52      /* Create a window on the screen and map it.*/
53      pwindow = GR_AddWindow(NULL, pVisual, NULL, NULL);
54      GR_MapWindow(pWindow);
55      XFlush(GR_IsDisplay(*pTestDisplay));
56      sleep(l);
57      GR_UnMapWindow(pWindow);
58      XFlush(GR_IsDisplay(*pTestDisplay));
59      GR_SubtractWindow(pWindow);
60      GR_SubtractVisual(pVisual);
61      } /for screen/
62      GR_ListDestroy(pScreens);
63      } /for displays/
64      GR_Close(GRPASS);
65      exit(0);
66} /*main( )*/
```

This test loops through all of the displays given to it via the command line, and for each display, loops through all of the screens of that display. For each screen, a random visual is picked from the screen's visual list and a window is created with it. The first line of interest is line 18. This call, GR_ListAllClOfType( ), creates a List of all of the displays specified on the command line and returns a handle to the list which is of type GRObject ** and also returns the first item in that list. This list can be manipulated via list operations, which are well known in the art. Since the loop will loop through all of the displays, a function is need to cycle through all of the screens. This is a little more tricky, since screens can be listed on the command line or may just exist on a display. Therefore, the screens to be tested must be chosen correctly. Line 34 creates a list of all screens specified on the command line and returns a variable tmpList which contains the screen information.

Line 35 calls the routine GR_ListChoosesUsesType( ), which uses tmpList as a parameter and ensures that all of the screens specified belong to the current display that is being used, as specified in *pTestDisplay. The variable pScreens now has the screens that must be looped through and tested. This looping is accomplished by line 42. Now that the display and screen have been obtained, a visual must be obtained. Line 47 calls the routine GR_AddRandomVisual( ), which randomly selects a visual from the current screen. It should be noted that filters may be specified for desirable attributes that the visual should support, such as class, depth and transparency.

The final step in the process is to create a window. All of the information that was specified is encapsulated in one object. Thus, when the GR_AddWindow( ) function is called on line 53, the window is automatically created.

The next example illustrates the archiving and comparing methods employed by the Grond test harness, which are used in most tests.

```
1 #include "Grond.h"
2
3 void main(int, char *[ ], char *[ ]);
4
5 void main(int argc, char *argv[ ], char *environ[ ])
6 {
7       GRObject              **pTestDisplay,
8                              *pDisplays,
9                              *tmpList,
10                             *pScreens,
11                             *pScreenItem,
12                             *pVisual,
13                             *pWindow,
14                             *pGC;
15      char                   *pDisplayName,
16                             *statusString,
17                             *pVisualString,
18                             subTest[200];
19      int                     i,
20                              screenNumber;
21      GRTestStatus            status,
22                              overallstatus = GRPASS;
23
24      /* initialize the GROND library. Note that this scans
25      * the command line.
26      */
27
28      GR_Initialize(0, argcl argv, environ);
29
30      /* Loop through each display in the command line or
31      *the display identified by the environment variable.
32      */
33
34      for (pTestDisplay = GR_ListAllClOfType(GR_DISPLAY,
35                              &pDisplays,
36                              (int) 0);
37          pTestDisplay != (GRObject **) NULL;
38          pTestDisplay = GR_ListNextItem(pDisplays))
39
40
41      /* identify the display being tested to the log file.*/
42
43      pDisplayName = GR_IsDisplayName(*pTestDisplay);
44      GR_WriteToLogfile(2, "play.c",
45                              "Testing display:%s",
46                              pDisplayName);
47
48      /* Get a list of the display's available screens to test. T
49      * screen are the screens identified by the command line or
50      * environment.
51      */
52
```

-continued

```
53              GR_ListAllClOfType(GR_SCREEN, &tmpList, 0);
54              GR_ListChooseUsesType(tmpList,
55                                              *pTestDisplay,
56                                              GR_DISPLAY,
57                                              &pScreens,
58                                              0);
59              GR_ListDestroy(tmpList);
60
61              /* Loop through each screen.
62
63              for (pScreenItem = GR_ListFirstItemValue(pScreens),
64                      pVisualString = NULL;
65                      pScreenItem = = NULL;
66                      pScreenItem = GR_ListNextItemValue(pScreens))
67              {
68
69                  screenNumber = GR_IsScreen(pScreenItem);
70
71                  /* Get a visual from the screen. A Random visual.*/
72
73                  if ((PVisual = GR_AddRandomVisual(pScreenItem,
74                                              -1, /* class */
75                                              -1, /* layer */
76                                              -1, /* transparency */
77                                              -1) /* depth */
78                                              ) = = NULL)
79                  {
80                      GR_ErrorHandler(GR_WARNING,
81                          "main",
82                          "Unable to get a visual from the"
83                          "display %s and screen %d",
84                          pDisplayName,
85                          screennumber);
86                      continue;
87
88                  } /if/
89
90                  if (pVisualString) free(pVisualString);
91                  pVisualString = GR_VisualString(pVisual);
92
93                  /* Create a window on the screen and map it.*/
94
95      if ((pwindow = GR_AddWindow(NULL, pVisual, NULL,
        NULL))
96      {
97                      GR_ErrorHandler(GR_WARNING),
98                          "main",
99                          "Unable to create a window for the"
100                         "display %s, screen %d, and visual %s",
101                         pDisplayName,
102                         screenNumber,
103                         pVisualString);
104                     continue;
105                 }
106
107                 /* Create a GC to draw with.*/
108
109                 if ((pGC = GR_AddGC(pWindow, (GRobject *) NULL,
110                                         (unsigned long) 0)) NULL)
111                 {
112                     GR_ErrorHandler(GR-WARNING,)
113                         "main",
114                         "Unable to create a GC for the"
115                         "display %s, screen %d, and visual %s",
116                         pDisplayName,
117                         screenNumber,
118                         pVisualString);
119                     continue;
120                 }
121
122                 /* A window is created, but in order to guarantee the p
123                 *archive results, the color map indexes used by the p
124                 *must be initialized.
125                 */
126
127                 {
128                     unsigned long valuemask = OUL;
129                     XGCValues           values;
130                     XColor              *whiteColorExact,
131                                         *blackColorExact;
132
133                     if((whiteColorExact = GR_AllocColor(pGC, "white"))
134                     {
135                         GR_ErrorHandler(
136                             GR_WARNING,
137                             "main",
138                             "Unable to allocate the color white for"
139                             "display %s on screen %d with visual %s",
140                             pDisplayName,
141                             screennumber,
142                             pVisualString);
143                         continue;
144                     } /if/
145
146
147                     if ((blackColorExact = GR_AllocColor(pGC, "black"))
148                     {
149                         GR_ErrorHandler(
150                             GR_WARNING,
151                             "main",
152                             "Unable to allocate the color white for"
153                             "display %s on screen %d with visual %s",
154                             pDisplayName,
155                             screenNumber,
156                             pVisualString);
157                         continue;
158                     } /if/
159
160                     values.foreground = whiteColorExact->pixel;
161                     values.background = blackColorExact->pixel;
162                     valueMask = (GCForeground I GCBackground);
163
164                     XChangeGC(GR_IsDisplay(pGC),
165                                         GR_IsGC(pGC),
166                                         valueMask,
167                                         &values);
168
169                     free(whiteColorExact);
170                     free(blackColorExact);
171
172                 }   /***{***/
173
174                 GR_MapWindow(pWindow);
175
176                 XSync(GR_IsDisplay(*pTestDisplay), False);
177
178                 /* Draw a diagonal line across the window.*/
179
180                 XDrawLine(GR_IsDisplay (pWindow),
181                                     GR_IsWindow(pWindow),
182                                     GR_ISGC(pGC),
183                                     0,0
184                                     GR_IsWindowWidth(pWindow)-l,
185                                     GR_IsWindowHeight(pWindow)-l);
186
187                 /* Now the window is drawn, now compare the window to the
188                 * archive. Since only black and white are used the archive
189                 * is visual independent.
190                 *
191
192                 /* Make sure the colormap in installed*/
193
194                 XInstallColormap(GR_IsDisplay(pWindow), GR_
        IsColormap(pWindow));
195
196                 XSync(GR_IsDisplay(*pTestDisplay), False);
197
198                 status = GR_ValidateWindow(
199                         pWindow,
200                         "uniqueNameForArchive",
201                         -1, /* Get the entire window*/
202                         -1,
203                         -1,
204                         -1,
205                         0, /** offset of archive to compare again*/
206                         0,
207                         False, /* specify max line width in path*/
208                         False, /* specify clipping in path*/
```

-continued

```
209              "my archives
210              0,
211              True);/* Use the scanning of attributes*/
212
213              GR_SubTestResult(status,
214                 "Testing display %d screen %d visual %s",
215                 pDisplayName, screennumber, pVisualStr)
216
217              if (status > overallstatus) overallstatus = status;
218
219              GR_UnMapWindow(pWindow);
220
221              GR_SubtractWindow(pWindow);
222              GR_SubtractGC(pGC);
223              GR_SubtractVisual(pVisual);
224
225         }     /*for screen*/
226
227         if (pVisualString) free(pVisualString);
228         GR_ListDestroy(pScreens);
229         free(pDisplayName);
230
231 }         /*for displays*/
232
233 GR_Close(overallStatus);
234
235 exit(0);
236
237} /*main( )*/
```

In this example, the test harness 4 loops through the displays, and for each display, it loops through the screens. A random visual is then chosen and window is created with it. When a line is rendered in the window and then either the results are archived or the results are compared against the archive if it exists. Lines 34 through 46 correspond to the beginning of the display loop. The log file is provided with the name of the display that is being tested. Lines 53 through 67 define the screens loop in the same manner as in the previous example. Lines 73 through 119 get a random visual, create a window with it and allocate a GC for our drawing routines. The block of code from line 127 through line 173 simply allocate a foreground and background color for the GC. Color allocation is very important in Grond since, in accordance with the preferred embodiment, exact RGB values are compared with archived values to determine pass or fail criteria. There are instances in X where exact values cannot be allocated. When this happens, a failure will occur when archives are compared to the test results. Therefore, the return color values will be checked and if they are not exact, the test will not be performed.

Line 180 is a critical part of the test. This is where the window is rendered with the GC just created. Any type of rendering can happen here, e.g., lines, circles, arcs, etc. This is the result that will be compared to the archives. Lines 194 and 196 are also important. These lines ensure that the correct colormap is loaded and that all the rendering is on the screen when the call is made to validate the test results. Otherwise, a failure will occur. Line 198, GR_ValidateWindow( ), is the call that creates archives or compares the rendered window (or area of the screen) against an existing archives. When the "-archive" token appears on the command line, Grond is instructed to create an archive structure for the current pass. So when GR_ValidateWindow( ) is called, an archive is created. When the "-archive" token is not on the command line, Grond attempts to find an existing archive with which to compare the current results in the manner discussed above with respect to FIG. 5. This call will return a pass or fail condition.

In the interest of brevity, a detailed discussion of the entire test harness code will not be provided herein because it is believed that the discussions of the header files shown in FIGS. 4A–4F, of the archive tree shown in FIG. 5, and of the API examples provided above are sufficient to enable persons skilled in the art to practice the invention.

It should be noted that the present invention has been described with respect to the preferred embodiments but that the present invention is not limited to these embodiments. It will be apparent to those skilled in the art that that the testing system of the present invention may be implemented in a number of ways and that the present invention is not limited to the embodiments discussed above. Furthermore, it should be noted that the present invention is not limited with respect to the types of tests which can be used to test the X Server or with respect to the manner in which the test archives are created, stored or used to determine whether a test of the X Server passes or fails.

It will be apparent to those skilled in the art that some of the components of the testing system of the present invention may be implemented in hardware and/or software and that the present invention is not limited to the manner in which the components of the testing system are implemented. It should also be noted that the test harness code can be designed in many different ways to achieve the goals of the present invention and that the present invention is not limited to the code discussed herein.

What is claimed is:

1. A testing system for testing an X Server of an X Windows system, the testing system comprising:

an X Server running on a machine, the X Server causing an image to be rendered to a screen in communication with the X Server in response to requests received by the X Server from a test application program, the test application program corresponding to an X client of the X Windows system;

a test archives database, the test archives database comprising test archives, each test archive corresponding to expected test results for a given test; and a test harness in communication with the X server, the test harness obtaining information from a screen being driven by the X Server, the information obtained by the test harness relating to said image rendered to said screen, the information obtained from the X Server by the test harness corresponding to test results, the test harness searching the test archives database to obtain a test archive associated with the test application program, the test harness comparing the associated test archive with the test results to determine whether a defect exists in the X Server.

2. The testing system of claim 1, wherein the test application program is running on an X client machine in communication with the machine on which the X Server is running.

3. The testing system of claim 1, wherein the test application program is running on the same machine on which the X Server is running.

4. The testing system of claim 1, wherein the information obtained by the test harness is red, green and blue (R,G,B) data, the R,G,B data being based on framebuffer contents of a framebuffer comprised by the screen being driven by the X Server, on colormap contents of a colormap comprised by the screen being driven by the X Server, and hardware attribute values relating to said framebuffer.

5. The testing system of claim 1, wherein the test harness is an object-oriented computer program that utilizes a display object, a screen object, a visual object, a pixmap object, a graphics content (GC) object, a colormap object, and a window object.

6. The testing system of claim 5, wherein the display object is an input dependency of the screen object, the screen object is an input dependency of the visual object, the pixmap object and the GC object, the visual object is an input dependency of the colormap object, and the colormap object is an input dependency of the window object.

7. The testing system of claim 1 further comprising a test result database, wherein when the test harness determines that a defect exists in the X Server, the test harness stores the test archive and the test results in the test result database.

8. The testing system of claim 7 further comprising a viewing tool, the viewing tool obtaining the test results and the test archive from the test result database, the viewing tool performing a logical operation on the test results and the test archive to obtain a composite image, the viewing tool displaying an image of the test results, an image of the test archive and the composite image so that a user can view the displayed images to determine the nature of the X Server defect.

9. The testing system of claim 8, wherein the logical operation performed by the viewing tool is an exclusive OR operation.

10. The testing system of claim 8, wherein the logical operation performed by the viewing tool is an OR operation.

11. The testing system of claim 8, wherein the logical operation performed by the viewing tool is an AND operation.

12. The testing system of claim 7 further comprising a viewing tool, the viewing tool obtaining the test results and the test archive from the test result database, the viewing tool displaying the test archive over the test results and flashing the test archive to enable the user to determine the nature of the X Server defect.

13. A test harness computer program embodied on a computer-readable medium, the test harness program utilized for testing an X Server to determine whether a defect exists in the X Server, the test harness program comprising:

a display object, the display object comprising a data structure describing a display connection, the display connection corresponding to a machine on which the X Server is running;

a screen object, the screen object comprising a data structure describing a graphics device being driven by the X Server to cause an image to be rendered to a screen, the data structure of the screen object including the data structure of the display object;

a visual object, the visual object comprising a data structure describing color capabilities of said graphics device, the data structure of the visual object including the data structure of the screen object;

a colormap object, the colormap object comprising a data structure describing a mapping from a number to a color, the data structure of the colormap including the data structure of the visual object;

a window object, the window object comprising a data structure describing an area on the screen, the data structure of the window object including the data structure of the colormap object;

a root window object, the root window object comprising a data structure describing a parent window of said window object, the data structure of said window object including the data structure of said root window;

a pixmap object, the pixmap object comprising a data structure describing an image stored in a memory device, the data structure of the pixmap object including the data structure of the screen object; and a graphics context (GC) object, the graphics context object comprising a data structure describing depth characteristics of the screen, the data structure of the graphics context object including the data structure of the screen object.

14. A testing system for testing an X Server of an X Windows system, the testing system comprising:

an X Server running on a machine, the X Server causing an image to be rendered to a screen in communication with the X Server in response to requests received by the X Server from a test application program, the test application program corresponding to an X client of the X Windows system;

a test harness in communication with the X server, the test harness obtaining information from a screen being driven by the X Server, the information obtained by the test harness relating to said image rendered to said screen, the information obtained from the X Server by the test harness corresponding to test results, the test harness obtaining a test archive associated with the test application program from a test archive database and comparing the associated test archive with the test results to determine whether a defect exists in the X Server; and a viewing tool, the viewing tool processing the test results and the test archive to obtain a composite image, the viewing tool displaying the composite image so that a user can determine the nature of the X Server defect.

15. The testing system of claim 14, wherein the test application program is running on an X client machine in communication with the machine on which the X Server is running.

16. The testing system of claim 14, wherein the test application program is running on the same machine on which the X Server is running.

17. The testing system of claim 14, wherein the information obtained by the test harness is red, green and blue (R,G,B) data, the R,G,B data being based on framebuffer contents of a framebuffer comprised by the screen being driven by the X Server, on colormap contents of a colormap comprised by the screen being driven by the X Server, and hardware attribute values relating to said framebuffer.

18. The testing system of claim 14, wherein the test harness is an object-oriented computer program that utilizes a display object, a screen object, a visual object, a pixmap object, a graphics content (GC) object, a colormap object, and a window object.

19. The testing system of claim 18, wherein the display object is an input dependency of the screen object, the screen object is an input dependency of the visual object, the pixmap object and the GC object, the visual object is an input dependency of the colormap object, and the colormap object is an input dependency of the window object.

20. The testing system of claim 14 further comprising a test result database, wherein when the test harness determines that a defect exists in the X Server, the test harness stores the test archive and the test results in the test result database, and wherein the viewing tool obtains the test results and the test archive from the test result database.

21. The testing system of claim 14, wherein the viewing tool also displays an image of the test results and an image of the test archive.

22. The testing system of claim 21, wherein the viewing tool processes the test archive and the test results by performing an exclusive OR operation with the test archive and the test results.

23. The testing system of claim 21, wherein the viewing tool processes the test results and the test archive by performing an OR operation.

24. The testing system of claim 21, wherein the viewing tool processes the test results and the test archive by performing an AND operation.

25. A method for testing an X Server to determine whether a defect exists in the X Server, the method comprising the steps of:

running a test on the X Server to cause the X Server to render an image to a screen;

capturing the image rendered to the screen, the captured image being obtained from a screen being driven by the X Server;

searching a test archive database for a test archive associated with the test being run on the X Server; and obtaining the associated test archive from the test archive database and comparing the associated test archive with the captured image to determine whether the test passed or failed, wherein, if the test failed, a defect exists in the X Server.

26. The method of claim 25, wherein if the test failed, a composite image comprised of the captured image and the test archive is displayed to the user to facilitate a user in determining the nature of the defect.

27. The method of claim 26, further comprising the steps of:

storing the associated test archive and the captured image in a test results database after the associated test archive and the captured image have been compared to each other and before the composite image has been displayed; and reading the captured image and the associated test archive from the test results and performing an operation on the captured image and the associated test archive to generate the composite image.

28. The method of claim 27, wherein the operation corresponds to taking an exclusive OR of the captured image and of the test archive image to generate the composite image.

29. The method of claim 27, wherein the operation corresponds to taking an AND of the captured image and of the test archive image to generate the composite image.

30. The method of claim 27, wherein the operation corresponds to taking an OR of the captured image and of the test archive image to generate the composite image.

31. The method of claim 27, wherein the operation corresponds to displaying the test archive image over the captured image and flashing the test archive image to generate the composite image.

32. A method for testing an X Server to determine whether a defect exists in the X Server, the method comprising the steps of:

running a test on the X Server to cause the X Server to render an image to a screen;

capturing the image rendered to the screen, the captured image being obtained from a screen being driven by the X Server;

searching a test archive database for a test archive associated with the test being run on the X Server;

obtaining the associated test archive from the test archive database and comparing the associated test archive with the captured image to determine whether the test passed or failed, wherein, if the test failed, a defect exists in the X Server;

if the test failed, displaying a composite image comprised of the captured image and the test archive to facilitate a user in determining the nature of the defect.

33. The method of claim 32, further comprising the steps of:

storing the associated test archive and the captured image in a test results database after the associated test archive and the captured image have been compared to each other and before the composite image has been displayed; and reading the captured image and the associated test archive from the test results and performing a logical operation on the captured image and the associated test archive to generate the composite image.

34. The method of claim 33, wherein the logical operation corresponds to taking an exclusive OR of the captured image and of the test archive image to generate the composite image.

35. The method of claim 33, wherein the logical operation corresponds to taking an AND of the captured image and of the test archive image to generate the composite image.

36. The method of claim 33, wherein the logical operation corresponds to taking an OR of the captured image and of the test archive image to generate the composite image.

37. The method of claim 33, wherein the logical operation corresponds to displaying the test archive image over the captured image and flashing the test archive image to generate the composite image.

* * * * *